United States Patent
Gu et al.

(10) Patent No.: US 9,854,445 B1
(45) Date of Patent: Dec. 26, 2017

(54) DOMAIN-AWARE DEVICE PROTECTION VIA CROSS-VALIDATION AMONG SPATIALLY-ADJACENT DEVICES

(71) Applicant: International Business Machines Corporation, Armonk, NY (US)

(72) Inventors: Zhongshu Gu, Croton-on-Hudson, NY (US); Heqing Huang, Mahwah, NJ (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/413,632

(22) Filed: Jan. 24, 2017

(51) Int. Cl.
| | | |
|---|---|---|
| *H04M 1/66* | (2006.01) | |
| *H04W 12/08* | (2009.01) | |
| *H04W 8/00* | (2009.01) | |
| *H04W 76/02* | (2009.01) | |
| *H04W 4/00* | (2009.01) | |
| *H04W 68/00* | (2009.01) | |
| *H04W 64/00* | (2009.01) | |
| *H04L 29/08* | (2006.01) | |

(52) U.S. Cl.
CPC ........... *H04W 12/08* (2013.01); *H04W 4/008* (2013.01); *H04W 8/005* (2013.01); *H04W 64/00* (2013.01); *H04W 68/00* (2013.01); *H04W 76/023* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 9,069,993 | B2 * | 6/2015 | Hirsch | ............. G06F 21/88 |
| 2013/0173455 | A1 * | 7/2013 | Adams | ............. H04B 5/00 |
| | | | | 705/39 |

(Continued)

FOREIGN PATENT DOCUMENTS

| | | |
|---|---|---|
| WO | WO2016010195 A1 | 1/2016 |
| WO | WO2016172492 A1 | 10/2016 |

OTHER PUBLICATIONS

Li et al., "Unobservable Re-authenitcation for Smartphones", 20th Annual Network & Distributed System Security Symposium, Apr. 23, 2013, 16 pages.

(Continued)

*Primary Examiner* — Shantell L Heiber
(74) *Attorney, Agent, or Firm* — Yee & Associated, P.C.; Jeffrey S. LaBaw

(57) ABSTRACT

Protecting a mobile device is provided. A first set of IoT devices in a first domain at a first geographic location is established by communicating with respective members of the first set of IoT devices. Respective ones of the first set of IoT devices are identified within the first domain as registered to a user corresponding to a mobile device based on a list of registered devices generating a registered subset of IoT devices that includes the mobile device. It is determined that the mobile device is in an unsecure environment based on establishing proximity to unknown IoT devices that are not members of the registered subset of IoT devices. A self-protection mode of operation is launched on the mobile device in response to determining that the mobile device is in the unsecure environment based on establishing proximity to the unknown IoT devices.

20 Claims, 6 Drawing Sheets

(56) References Cited

U.S. PATENT DOCUMENTS

2016/0112374 A1\* 4/2016 Branca ................ H04L 63/102
                                                          726/1
2016/0285904 A1   9/2016 Ye et al.

OTHER PUBLICATIONS

Li et al., "iLock: immediate and Automatic Locking of Mobile Devices against Data Theft",CCS '16 Proceedings of the 2016 ACM SIGSAC Conference on Computer and Communications Security, Oct. 24-28, 2016, pp. 933-944, Abstract Only.

Mare et al., "ZEBRA: Zero-Effort Bilateral Recurring Authentication", 2014 IEEE Symposium on Security and Privacy, May 2014, 16 pages.

\* cited by examiner

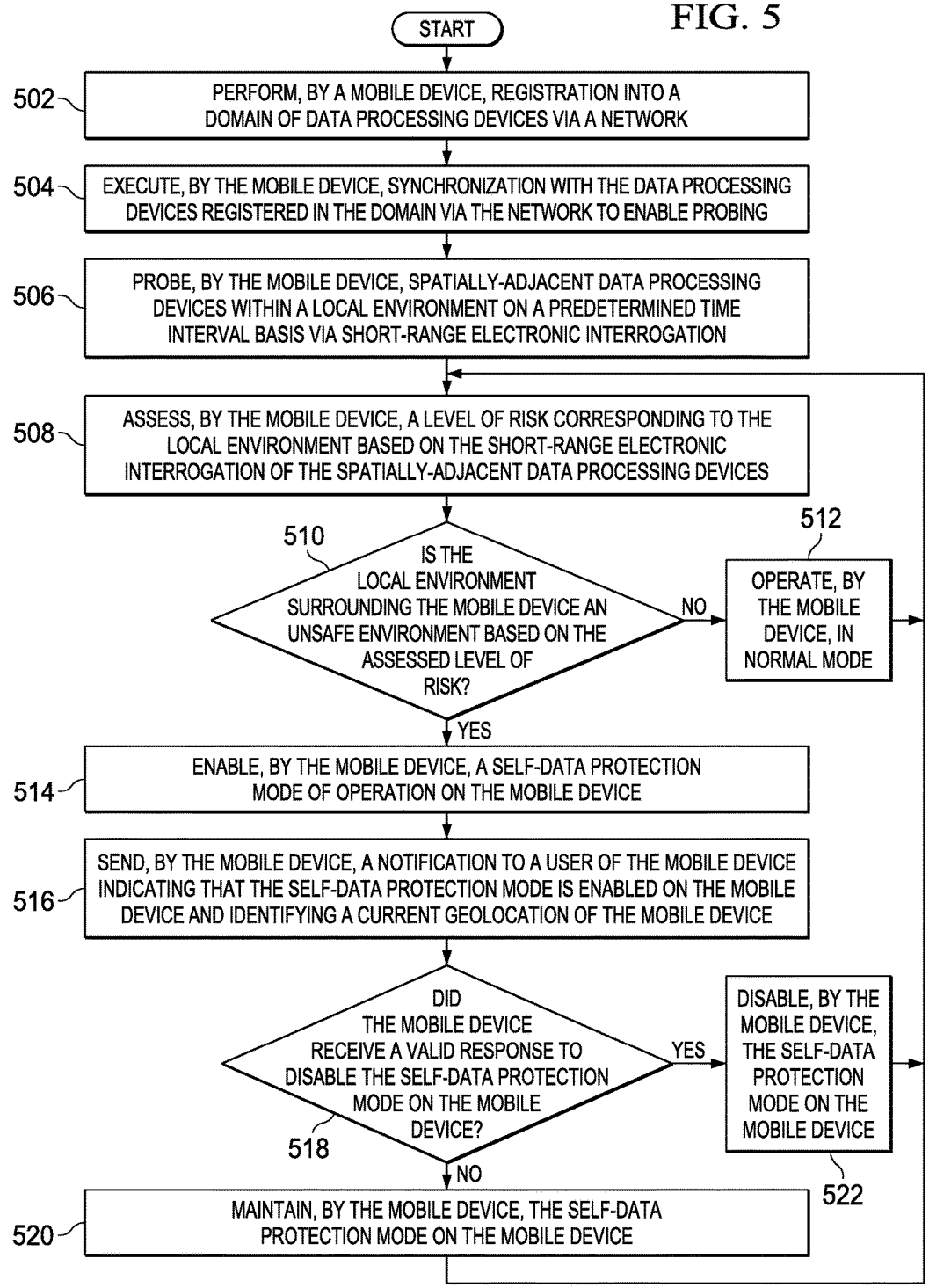

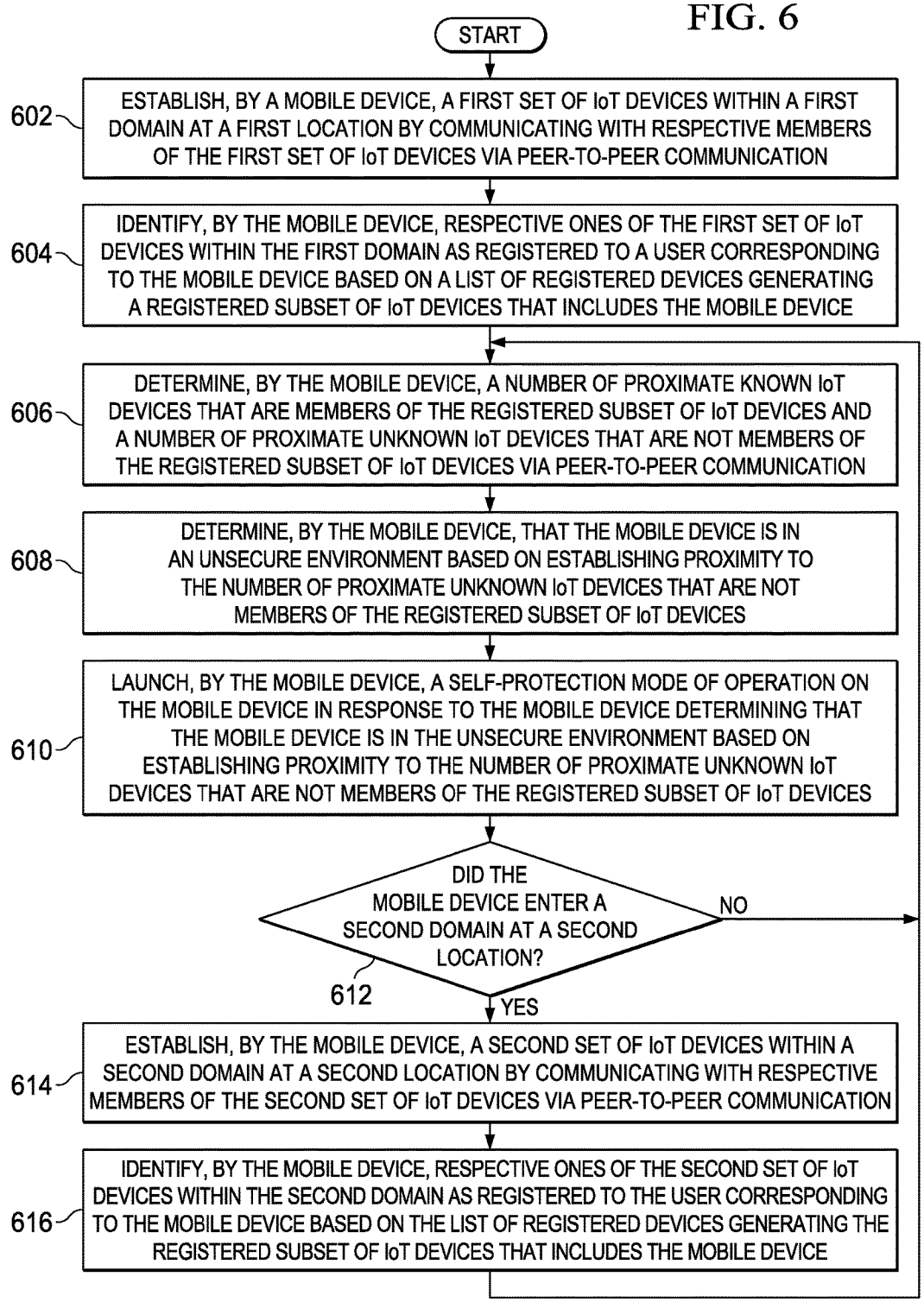

DOMAIN-AWARE DEVICE PROTECTION VIA CROSS-VALIDATION AMONG SPATIALLY-ADJACENT DEVICES

BACKGROUND

1. Field

The disclosure relates generally to mobile device protection and more specifically to protecting data on a mobile Internet of Things device using cross-validation among spatially-adjacent Internet of Things devices that are registered in a same domain as the mobile Internet of Things device and connected to the mobile Internet of Things device via a short-range communication network at a geographic location corresponding to that domain.

2. Description of the Related Art

Nowadays individuals own or control multiple Internet of Things (IoT) devices. Internet of Things is the internetworking of physical devices (also known as "smart devices") embedded with electronics, software, sensors, actuators, and network connectivity, which enables these devices to collect and exchange data. However, these IoT devices have different mobility profiles. Some of these IoT devices have static profiles, which means that this type of IoT device rarely changes its location as a function of time. Examples of static profile IoT devices may include smart appliances located in a home, smart thermostats, smart badge readers and/or smart door locks associated with secure entrances to businesses, smart traffic signals along commuter routes, and the like. Other IoT devices have mobile profiles, which means that this type of IoT device may change locations frequently and rely on a mobile network for connectivity. Examples of mobile profile IoT devices that are equipped with wireless connectivity and change geographic location frequently may include mobile phones, tablet computers, wearables such as smart watches, medical implants such as heart monitors and pacemakers, autonomous and semi-autonomous vehicles, aerial drones, and the like. Typically, these mobile IoT devices store confidential or sensitive data. In addition, the mobility of these mobile IoT devices also makes them prone to loss and theft. Once these mobile IoT devices are in the possession of unknown entities, the confidential data stored in these mobile IoT devices is at an increased risk of unauthorized access and disclosure.

SUMMARY

According to one illustrative embodiment, a computer-implemented method for protecting a mobile device is provided. The mobile device establishes a first set of IoT devices in a first domain at a first geographic location by communicating with respective members of the first set of IoT devices. The mobile device identifies respective ones of the first set of IoT devices within the first domain as registered to a user corresponding to the mobile device based on a list of registered devices generating a registered subset of IoT devices that includes the mobile device. The mobile device determines that the mobile device is in an unsecure environment based on establishing proximity to unknown IoT devices that are not members of the registered subset of IoT devices. The mobile device launches a self-protection mode of operation on the mobile device in response to the mobile device determining that the mobile device is in the unsecure environment based on establishing proximity to the unknown IoT devices. According to other illustrative embodiments, a mobile data processing system and computer program product for protecting a mobile device are provided.

BRIEF DESCRIPTION OF THE DRAWINGS

FIG. 5 is a flowchart illustrating a process for assessing a risk level corresponding to a local environment surrounding a mobile IoT device in accordance with an illustrative embodiment; and FIG. 6 is a flowchart illustrating a process for launching a self-protection mode of operation on a mobile IoT device in accordance with an illustrative embodiment.

DETAILED DESCRIPTION

Figure 1:
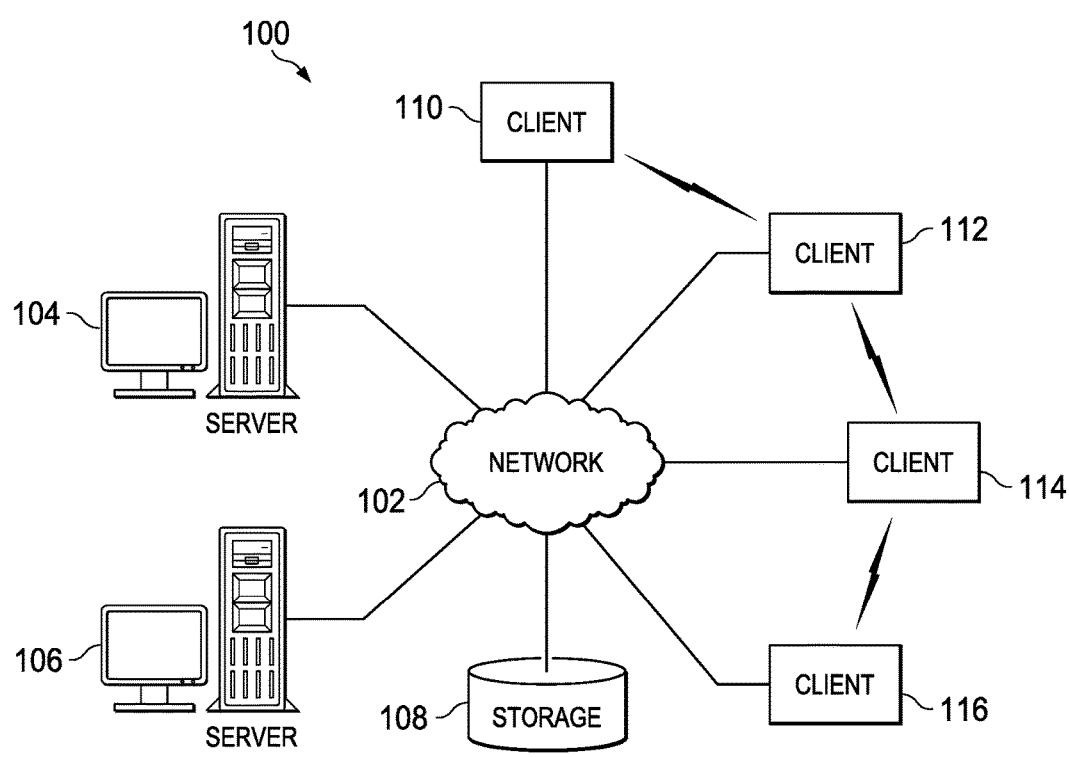
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 or server 106 may provide a set of services, such as voice, email, and/or text communication services, to client devices. Further, it should be noted that illustrative embodiments may utilize server 104 or server 106 to provide notifications regarding possible loss or theft of client devices and current geographic locations of the client devices via the communication services. Furthermore, it should be noted that server 104 and server 106 may each represent a plurality of servers hosting different types of services. For example, server 104 or server 106 may provide information, such as software applications, programs, and updates to the client devices. Moreover, it should be noted that illustrative embodiments do not require server 104, server 106, and storage 108. In other words, server 104, server 106, and storage 108 are optional components for different illustrative embodiments.

Client 110, client 112, client 114, and client 116 also connect to network 102. Clients 110, 112, 114, and 116 may each represent a number of different types of data processing systems, such as, for example, smart phones, smart watches, handheld computers, desktop computers, laptop computers, personal digital assistants, gaming devices, smart appliances, smart thermostats, smart televisions, smart wearable devices, smart medical devices, smart vehicles, drones, and the like. Further, it should be noted that clients 110, 112, 114, and 116 have direct wireless communication with one another to form one or more peer-to-peer networks between the client devices.

Storage 108 is a network storage device capable of storing any type of data in a structured format or an unstructured format. In addition, storage 108 may represent a plurality of network storage devices. Furthermore, storage unit 108 may store authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a personal area network (PAN), an ad-hoc wireless fidelity (WiFi) network, a peer-to-peer (P2P) network, and a wide area network (WAN). FIG. 1 is intended as an example only, and not as an architectural limitation for the different illustrative embodiments.

Figure 2:
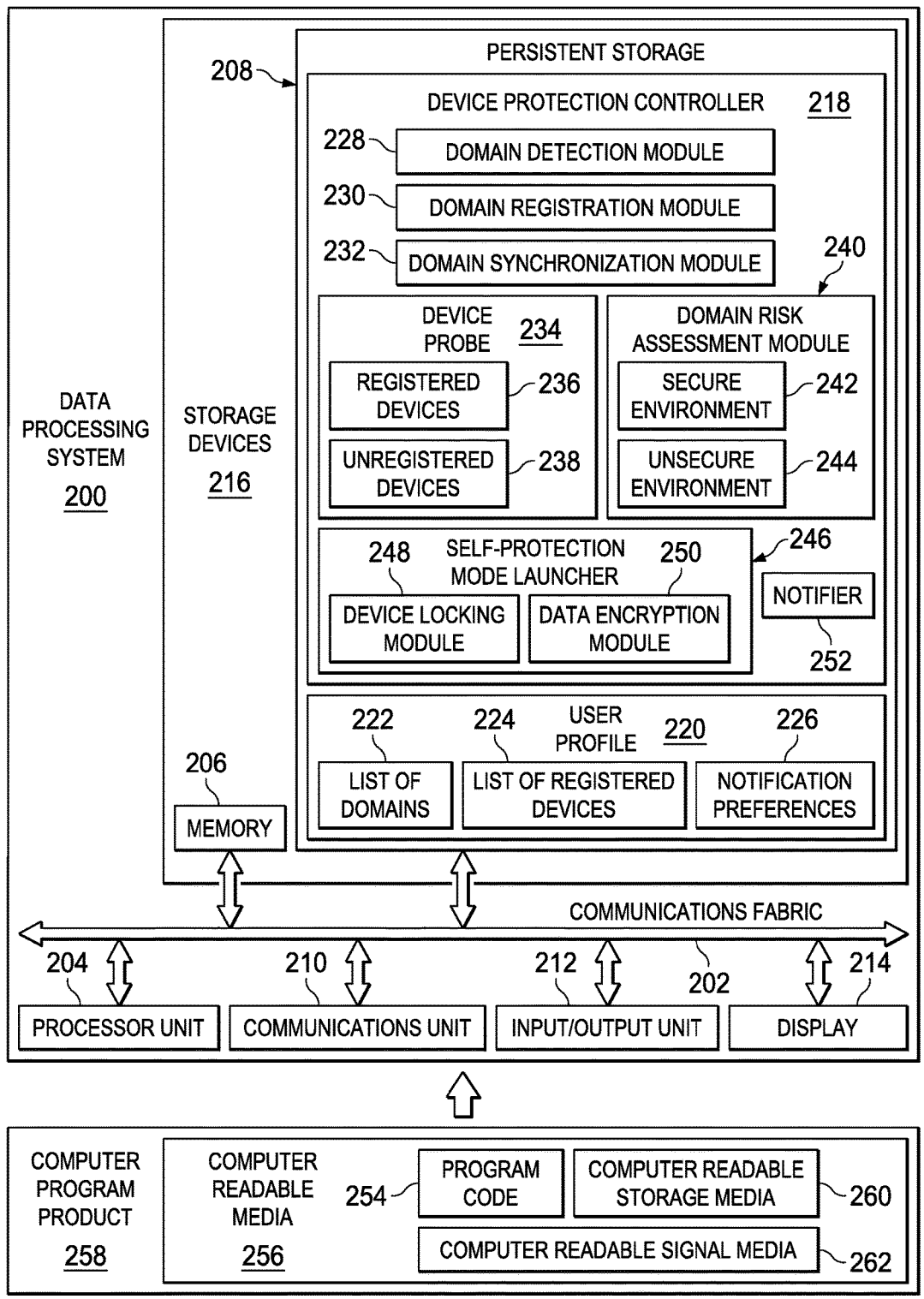
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a mobile device, such as client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores device protection controller 218 and user profile 220. However, it should be noted that even though device protection controller 218 is illustrated as residing in persistent storage 208, in an alternative illustrative embodiment device protection controller 218 may be a separate component of data processing system 200. For example, device protection controller 218 may be a hardware component coupled to communication fabric 202 or a combination of hardware and software components.

User profile 220 contains information corresponding to an authorized user of data processing system 200. The information in user profile 220 may include, for example, a name of the user, geographic locations of home and work place corresponding to the user, authentication data such as user name, password, passcode, and/or biometric template corresponding to the user, and the like. In this example, user profile 220 also includes list of domains 222, list of registered devices 224, and notification preferences 226.

List of domains 222 represents a set of one or more IoT device domains created by the user of data processing system 200. Each domain in the set of IoT device domains includes list of registered devices 224. List of registered devices 224 represents a listing of each IoT device that the user of data processing system 200 registered into a particular domain. Each IoT device listed in list of registered devices 224 is a known IoT device to data processing system 200. It should be noted that data processing system 200 also is listed in list of registered devices 224 so that data processing system 200 is known by the other IoT devices in list of registered devices 224.

Device protection controller 218 protects data on data processing system 200 using cross-validation among spatially-adjacent IoT devices, such as clients 112-116 in FIG. 1, which are registered in a same domain as data processing system 200 and connected to data processing system 200 via a short-range communication network at a geographic location corresponding to the domain. The geographic location corresponding to the domain may be, for example, a residence or work location corresponding to the authorized user of data processing system 200. Device protection controller 218 protects the data on data processing system 200 by locking data processing system 200 and/or encrypting the data in response to device protection controller 218 detecting that the environment surrounding data processing system 200 is unsafe or unsecure. In addition, device protection controller 218 may send a notification to the authorized user of data processing system 200 based on notification preferences 226 when device protection controller 218 detects an unsafe or unsecure environment surrounding data processing system 200. Notification preferences 226 represent a preferred method of notification, such as text message, email, or voice message, by the user.

In this example, device protection controller 218 includes domain detection module 228, domain registration module 230, and domain synchronization module 232. Device protection controller 218 utilizes domain detection module 228 to detect when data processing system 200 enters a domain of registered IoT devices based on list of registered devices 224. After domain detection module 228 detects that data processing system 200 is in a domain, device protection controller 218 utilizes domain registration module 230 to register data processing system 200 with the other registered IoT devices in the domain. Further, data processing system 200 utilizes domain synchronization module 232 to synchronize and pair data processing system 200 with the other registered IoT devices in the domain.

On a predetermined time interval basis, data processing system 200 utilizes device probe 234 to electronically probe IoT devices within the surrounding environment via short-range interrogation. Device probe 234 identifies registered devices 236 and unregistered devices 238. Registered devices 236 represent a set of one or more IoT devices listed in list of registered devices 224. Unregistered devices 236 represent a number of unknown (i.e., not registered) IoT devices within the surrounding environment.

Device protection controller 218 utilizes domain risk assessment module 240 to assess the level of risk to data processing system 200 posed by the surrounding environment. Domain risk assessment module 240 determines whether the surrounding environment is secure environment 242 or unsecure environment 244. Domain risk assessment module 240 determines that the surrounding environment is secure environment 242 based on at least one registered IoT device in list of registered devices 224 being detected by device probe 234 in the surrounding environment. Domain risk assessment module 240 determines that the surrounding environment is unsecure environment 244 based on device probe 234 detecting only unregistered devices 236 in the surrounding environment.

In response to domain risk assessment module 240 determining that the surrounding environment is unsecure environment 244, data processing system 200 utilizes self-protection mode launcher 246 to launch a self-protection mode of operation on data processing system 200. Self-protection mode launcher 246 utilizes device locking module 248 to lock data processing system 200 preventing further use of data processing system 200. Self-protection mode launcher 246 utilizes data encryption module 250 to encrypt data on data processing system 200 preventing unauthorized access to the data. Data encryption module 250 may utilize, for example, a cryptographic key distributed by a trusted third party to encrypt the data.

In addition, device protection controller 218 utilizes notifier 252 to notify the authorized user of data processing system 200 that data processing system 200 is operating in a self-protection mode. Further, notifier 252 may notify the authorized user of the current geographic location of data processing system 200. Furthermore, notifier 252 may display the notification in display 214 and include in the notification an entry field for entering a valid access code or password to disable the self-protection mode.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, near field communication (NFC), Wi-Fi, Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Considering the availability of multiple IoT devices owned or controlled by one user, it typically is abnormal for one IoT device to be isolated without any other proximate IoT devices associated with that same user. For example, a mobile phone associated with the user may be adjacent and paired to one or more smart appliances when the user is at home. When the user is traveling in a vehicle, the user's mobile phone may be paired to an audio system in the vehicle. When the user is at work, the user's mobile phone may be paired to a computer or landline telephone. Moreover, the user's mobile phone may be paired to one or more smart wearable devices, such as an exercise monitor and heart rate monitor, located on or in the user. However, when the mobile phone is surrounded only by unknown IoT devices (i.e., IoT devices not owned or controlled by the user), the mobile phone may be in an unsafe or unsecure environment and exposed to unauthorized data access due to loss or theft of the mobile phone, for example.

Solutions currently exist to address the problem of device loss or theft. Some of these current solutions work by attaching a tag or beacon on the device that a user wants to track and using a software application to track the tag and pinpoint the location of the device. However, if the device is lost or stolen, a person may remove or damage the tag and, thus, the tag is unable to report the correct geographic location for the device. In addition, the tag cannot protect the data stored on the device. Other types of current solutions may allow remote "wipe-out" of on-device data when the user reports the device lost or stolen. However, this type of remote data wipe-out solution utilizes a specialized software application installed on the device and relies on the user recognizing and reporting the loss and the device still being connected to a network so that a remote server can send a command to the device to wipe or delete the data on the device.

Illustrative embodiments infuse the device with intelligence to autonomously assess the level of risk associated with the environment surrounding the device and to protect the data on the device when illustrative embodiments determine that the device is located within an unsafe or unsecure environment. Illustrative embodiments assess the current level of risk associated with the environment surrounding the device based on the relative spatial distance from the device to other IoT devices registered by the same user into an IoT device domain. If the device detects that it is isolated from other registered or known IoT devices (e.g., not within a predefined distance threshold set by the short-range communication technology utilized by the device to communicate with other IoT devices), the device automatically increases its protection level by locking the device and/or encrypting the data on the device to avoid data leakage.

In contrast with the currently existing solutions, which rely on a centralized server model, illustrative embodiments utilize a decentralized process located in the device, itself. For example, illustrative embodiments do not depend on the device being connected to a network server to receive a command to protect the on-device data. Further, illustrative embodiments do not depend on the user reporting the device lost or stolen. Instead, the device determines when the environment surrounding the device is unsafe or unsecure and automatically initiates one or more data protection action steps.

The user first registers all the IoT devices owned or controlled by the user to one or more IoT device domains corresponding to one or more geographic locations (e.g., home location, work location, and the like). Internet of Things devices within a same domain can cross-validate each other using illustrative embodiments. Any IoT device at a geographic location can check the surrounding environment to find spatially-adjacent IoT devices via short range communication technology, such as, for example, Bluetooth®. Any other registered IoT device, which is spatially-adjacent or nearby (e.g., within Bluetooth® communication range), may cross-validate the IoT device within the domain.

Unless the user specifically turns off or disables the data protection process of illustrative embodiments via an authentication process, such as, for example, entering a valid access code, the IoT device without being cross-validated within a domain by one or more registered IoT devices will automatically turn on or enable a self-protection mode of operation. Illustrative embodiments only allow a user passing the authentication process to reactivate the IoT device after the IoT device enters the self-protection mode. For example, if none of the spatially-adjacent IoT devices belong to the same domain as the IoT device, then the IoT device may launch the self-protection mode of operation to lock the IoT device and/or encrypt the on-device data and notify the user of the current geographic location of the IoT device when the IoT device has a network (e.g., Internet) connection.

Illustrative embodiments may be applied to any device with a Bluetooth® interface or other similar close field protocol, such as, for example, Z-Wave® or ZigBee®. Once a user registers a new IoT device into one or more domains, illustrative embodiments update the one or more domains with information corresponding to this newly registered IoT device and synchronize this newly registered IoT device with all other already-registered IoT devices within the one or more domains. At runtime, all registered IoT devices periodically send signals on a predetermined time interval basis to spatially-adjacent IoT devices. If a registered IoT device finds itself surrounded only by unknown (i.e., unregistered) IoT devices within an environment, then the registered IoT device may consider itself lost or stolen. As a result, the IoT device may immediately launch a self-protection mode of operation on the device to prevent unauthorized access to its data. This approach will not undermine the usability of the registered IoT device even if the device misclassifies itself as lost or stolen. For example, it is possible that the registered IoT device is away from other registered IoT devices within the same domain, but still in a safe environment. In this situation, a user of the registered IoT device may disable the self-protection mode of operation by entering a valid access code or password during an authentication process presented to the user by the IoT device.

Figure 3:
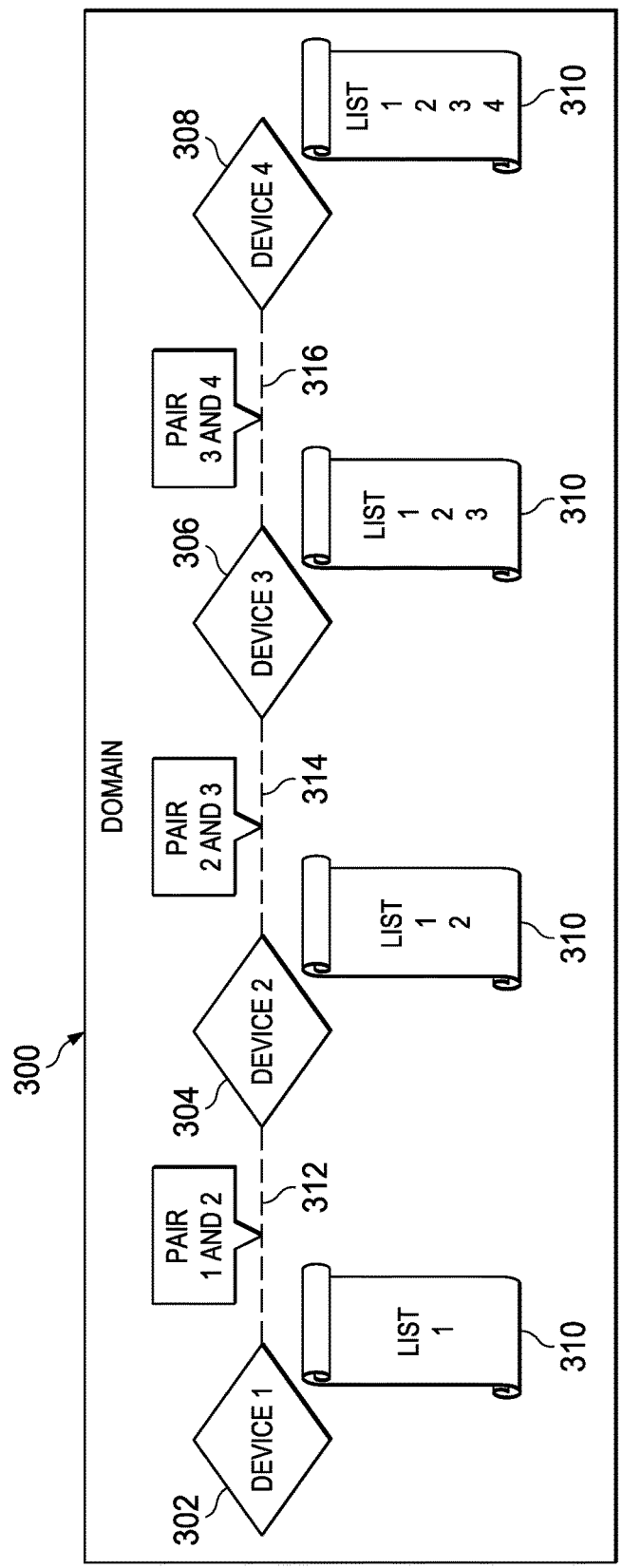
FIG. 3 is a diagram illustrating an example of domain in accordance with an illustrative embodiment.

With reference now to FIG. 3, a diagram illustrating an example of a domain is depicted in accordance with an illustrative embodiment. Domain 300 may be implemented in a network of data processing systems, such as network data processing system 100 in FIG. 1. Domain 300 represents a plurality of registered IoT devices, such as device 302, device 304, device 306, and device 308. Devices 302-308 may be, for example, clients 110-116 in FIG. 1. However, it should be noted that domain 300 may include fewer or more registered IoT devices than illustrated. In other words, domain 300 may include two or more IoT devices wirelessly connected via one or more short-range communication protocols.

Device 302 may be, for example, a mobile IoT device, such as data processing system 200 in FIG. 2. When device 302 enters domain 300, device 302 add device 302 to list 310. List 310 is a list of registered IoT devices, such as list of registered devices 224 in FIG. 2, in domain 300.

Device 302 synchronizes and pairs with device 304 at 312. Then, device 304 adds device 304 to list 310. In addition, device 304 synchronizes and pairs with device 306 at 314. Afterward, device 306 adds device 306 to list 310. Further device 306 synchronizes and pairs with device 308 at 316. Similarly, device 308 adds device 308 to list 310. It should be noted that illustrative embodiments synchronize and store list 310 on each of device 302, device 304, device 306, and device 308. Thus, each of device 302, device 304, device 306, and device 308 may cross-validate another registered device in domain 300.

Figure 4:
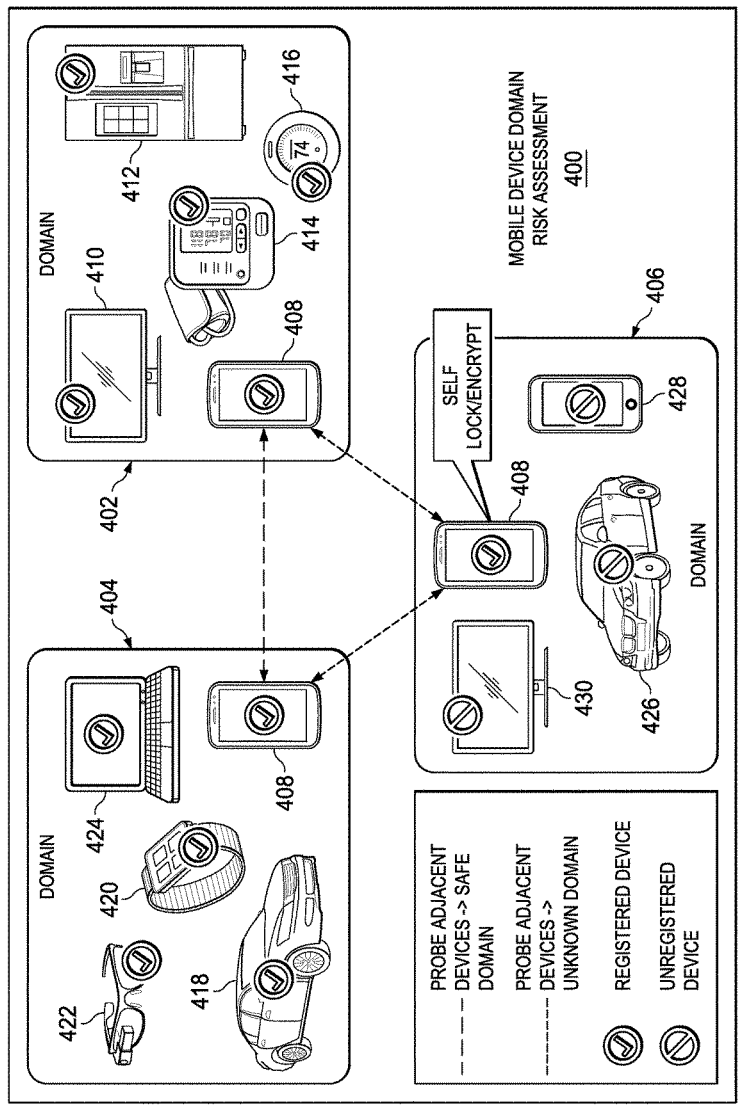
FIG. 4 is a diagram illustrating an example of IoT device domain risk assessment in accordance with an illustrative embodiment.

With reference now to FIG. 4, a diagram illustrating an example of IoT device domain risk assessment is depicted in accordance with an illustrative embodiment. Internet of Things device domain risk assessment 400 represents a level of risk corresponding to domain 402, domain 404, and domain 406. It should be noted that each of domain 402, domain 404, and domain 406 include mobile IoT device 408. In this example, mobile IoT device 408 is a smart phone. Also in this example, domain 402 also includes IoT devices 410, 412, 414, and 416; domain 404 also includes IoT devices 418, 420, 422, and 424; and domain 406 also includes IoT devices 426, 428, and 430.

In each of domain 402, domain 404, and domain 406, mobile IoT device 408 periodically probes spatially-adjacent IoT devices via short-range electronic interrogation and validates whether one or more of the spatially-adjacent IoT devices are registered in the same domain at the current geographic location of mobile IoT device 408 to determine whether a respective domain is a safe domain or an unknown domain. A safe domain may be, for example, secure environment 242 in FIG. 2. An unknown domain may be, for example, unsecure environment 244 in FIG. 2.

The mobility of IoT devices increases the chance of loss or theft. Sensitive or confidential data leakage of unlocked or unencrypted IoT devices may occur when the devices are in an unsafe or unsecure environment after loss or theft, for example.

Once mobile IoT device 408 enters an unknown domain, such as domain 406, then mobile IoT device 408 raises its risk alert level and launches a self-protection mode of operation on mobile IoT device 408. An unknown domain is a geographic location where mobile IoT device 408 is surrounded only by unregistered (i.e., unknown) IoT devices, such as IoT devices 426, 428, and 430. The self-protection mode of operation may include, for example, locking mobile IoT device 408 to enforce authorized user access only, encrypting data on mobile IoT device 408 to ensure data security and confidentiality, and the like. Mobile IoT device 408 may utilize, for example, a cryptographic key to encrypt the data.

In addition, the self-protection mode of operation may send a notification to the authorized user of mobile IoT device 408 indicating that the self-protection mode on mobile IoT device 408 is enabled and identifying a current geographic location of mobile IoT device 408. Further, the notification may include a data entry field for the authorized user to enter a valid access code or password to disable the self-protection mode.

Each of the registered IoT devices broadcast and synchronize a list of registered devices at pairing, which is similar to generating a social network clique within a network. A clique is a subgraph of at least two nodes in a network that are directly connected to one another. In this example, domain 402 and domain 404 are safe domain environments because IoT devices 410-416 and IoT devices 418-424 are registered IoT devices with their respective domains. Thus, illustrative embodiments provide increased data security for mobile IoT devices in fast-changing environments.

With reference now to FIG. 5, a flowchart illustrating a process for assessing a risk level corresponding to a local environment surrounding a mobile IoT device is shown in accordance with an illustrative embodiment. The process shown in FIG. 5 may be implemented in a mobile device, such as, for example, client 110 in FIG. 1, data processing system 200 in FIG. 2, device 302 in FIG. 3, or mobile IoT device 408 in FIG. 4.

The process begins when the mobile device performs registration into a domain of data processing devices via a network (step 502). The domain may be, for example, domain 300 in FIG. 3 or domain 402 in FIG. 4. The data processing devices registered in the domain may be, for example, devices 304-308 in FIG. 3 or devices 410-416 in FIG. 4. The network may be, for example, network 102 in FIG. 1.

The mobile device executes synchronization with the data processing devices registered in the domain via the network to enable probing (step 504). The mobile device probes spatially-adjacent data processing devices within a local environment on a predetermined time interval basis via short-range electronic interrogation (step 506). The mobile device may perform the short range electronic interrogation using, for example, Bluetooth® communication technology, NFC protocols, ad-hoc Wi-Fi communication protocols, and the like.

The mobile device assesses a level of risk corresponding to the local environment based on the short range electronic interrogation of the spatially-adjacent data processing devices (step 508). Afterward, the mobile device makes a determination as to whether the local environment surrounding the mobile device is an unsafe environment based on the assessed level of risk (step 510). The unsafe environment may be, for example, unsecure environment 244 in FIG. 2 or domain 406 in FIG. 4.

If the mobile device determines that the local environment surrounding the mobile device is a safe environment based on the assessed level of risk, no output of step 510, then the mobile device operates in normal mode (step 512). The safe environment may be, for example, secure environment 242 in FIG. 2 or domain 402 in FIG. 4. Thereafter, the process returns to step 508 where the mobile device continues to assess the level of risk. If the mobile device determines that the local environment surrounding the mobile device is an unsafe environment based on the assessed level of risk, yes output of step 510, then the mobile device enables a self-data protection mode of operation on the mobile device (step 514). The mobile device may enable the self-data protection mode of operation by utilizing, for example, self-protection mode launcher 246 to perform locking of the mobile device and/or encrypting data on the mobile device.

In addition, the mobile device sends a notification to a user of the mobile device indicating that the self-data protection mode is enabled on the mobile device and identifying a current geolocation of the mobile device (step 516). The mobile device may utilize, for example, notifier 252 to send the notification to the user of the mobile device. The notification may be in the form of a text message, an email message, or a voice message, for example. The mobile device may utilize, for example, notification preferences in a user profile, such as notification preferences 226 in FIG. 2, to determine which form of notification to send to the user. Moreover, the notification may include an input field or response section to input a valid access code, such as a password or personal identification number, or a valid voice response to disable the self-data protection mode. Subsequently, the mobile device makes a determination as to whether the mobile device received a valid response to the notification to disable the self-data protection mode on the mobile device (step 518). A valid response also may include a biometric or keypad input on the mobile device, for example.

If the mobile device determines that the mobile device did not receive a valid response to disable the self-data protection mode on the mobile device, no output of step 518, then the mobile device maintains the self-data protection mode on the mobile device (step 520). Thereafter, the process returns to step 508 where the mobile device continues to assess the level of risk. If the mobile device determines that the mobile device did receive a valid response to disable the self-data protection mode on the mobile device, yes output of step 518, then the mobile device disables the self-data protection mode on the mobile device (step 522). Thereafter, the process returns to step 508 where the mobile device continues to assess the level of risk.

With reference now to FIG. 6, a flowchart illustrating a process for launching a self-protection mode of operation on a mobile IoT device is shown in accordance with an illustrative embodiment. The process shown in FIG. 6 may be implemented in a mobile IoT device, such as, for example, client 110 in FIG. 1, data processing system 200 in FIG. 2, device 302 in FIG. 3, or mobile IoT device 408 in FIG. 4.

The process begins when the mobile device establishes a first set of IoT devices within a first domain at a first location by communicating with respective members of the first set of IoT devices via peer-to-peer communication (step 602). The first set of IoT devices within the first domain may be, for example, devices 408-416 within domain 402 in FIG. 4. The mobile device may accomplish the peer-to-peer communication via short-range electronic communication, such as Bluetooth® communication, NFC, ad-hoc Wi-Fi communication, or the like.

Further, the mobile device identifies respective ones of the first set of IoT devices within the first domain as registered to a user corresponding to the mobile device based on a list of registered devices generating a registered subset of IoT devices that includes the mobile device (step 604). The list of registered devices may be, for example, list of registered devices 224 in FIG. 2. The mobile device determines a number of proximate known IoT devices that are members of the registered subset of IoT devices and a number of proximate unknown IoT devices that are not members of the registered subset of IoT devices via peer-to-peer communication (step 606). The number of proximate unknown IoT devices may be, for example, devices 426-430 in FIG. 4.

The mobile device determines that the mobile device is in an unsecure environment, such as unsecure environment 244 in FIG. 2, based on establishing proximity to the number of proximate unknown IoT devices that are not members of the registered subset of IoT devices (step 608). The mobile device determines that it is in the unsecure environment in response to establishing proximity to only unknown IoT devices at the first location. The mobile device determines that it is in a secure environment, such as secure environment 242 in FIG. 2, in response to establishing proximity to at least one member of the registered subset of IoT devices in the first domain. In an alternative embodiment, the mobile device may determine that it is in an unsecure environment based on a number of proximate known and a number of proximate unknown devices in the first location. For example, proximate unknown devices in the first location may indicate that an unauthorized person entered the first location (e.g., home) and that the mobile device should increase its security level. Proximate unknown devices also may indicate that the user of the mobile device is not in a safe environment any more (e.g., moved away from the home). Sensing proximate unknown devices may cause the mobile device to generate a security alert to check the geographic location of the mobile device to determine whether the mobile device has moved from a safe home environment. In another alternative embodiment, the user may create rules for certain subsets of registered IoT devices. As an example, assume the user regularly travels with a certain subset of registered IoT devices, such as a smart phone, a laptop, and Bluetooth® enabled keyfob. Using this example, the user may create a rule that states when the mobile device (i.e., smart phone) senses this subset of registered IoT devices, then the mobile device may consider its current location as a safe environment even though the mobile device is not at the first location because the mobile device is still likely to be in the possession of the authorized user. Another rule may state that even though the mobile device senses the subset of registered IoT devices, a number of proximate unknown devices sensed by the mobile device is greater than or equal to a threshold number of proximate unknown devices, which causes the mobile device to launch a self-protection mode of operation. In other words, the rule may define a threshold number of proximate unknown devices or a percentage of proximate unknown devices versus the subset of registered IoT devices. The mobile device launches a self-protection mode of operation on the mobile device in response to the mobile device determining that the mobile device is in the unsecure environment based on establishing proximity to the number of proximate unknown IoT devices that are not members of the registered subset of IoT devices (step 610).

In addition, the mobile device makes a determination as to whether the mobile device entered a second domain at a second location (step 612). If the mobile device determines that the mobile device did not enter a second domain at a second location, no output of step 612, then the process returns to step 606 where the mobile device continues to determine the number of known and unknown IoT devices that are proximate or spatially-adjacent (i.e., within a predefined distance corresponding to a short-range electronic communication protocol) to the mobile device. If the mobile device determines that the mobile device did enter a second domain at a second location, yes output of step 612, then the mobile device establishes a second set of IoT devices within a second domain at a second location by communicating with respective members of the second set of IoT devices via peer-to-peer communication (step 614). The second set of IoT devices within the second domain at the second location may be, for example, devices 408 and 420-424 within domain 404 in FIG. 4.

Furthermore, the mobile device identifies respective ones of the second set of IoT devices within the second domain as registered to the user corresponding to the mobile device based on the list of registered devices generating the registered subset of IoT devices that includes the mobile device (step 616). Thereafter, the process returns to step 606 where the mobile device continues to determine the number of known and unknown IoT devices that are proximate to the mobile device.

Thus, illustrative embodiments of the present invention provide a computer-implemented method, mobile data processing system, and computer program product for protecting data stored on a mobile IoT device using cross-validation among spatially-adjacent IoT devices that are registered in a same domain as the mobile IoT device and connected to the mobile IoT device via a short-range communication network at a geographic location corresponding to the domain. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for protecting a mobile device,
the computer-implemented method comprising:
establishing, by the mobile device, a first set of Internet of Things (IoT) devices in a first domain at a first geographic location by communicating with respective members of the first set of IoT devices;
identifying, by the mobile device, respective ones of the first set of IoT devices within the first domain as registered to a user corresponding to the mobile device based on a list of registered devices generating a registered subset of IoT devices that includes the mobile device;
determining, by the mobile device, a number of proximate known IoT devices that are members of the registered subset of IoT devices at the first geographic location and a number of proximate unknown IoT devices that are not members of the registered subset of IoT devices at the first geographic location;
determining, by the mobile device, whether the number of proximate unknown IoT devices that are not members of the registered subset of IoT devices at the first geographic location is greater than or equal to a threshold number of proximate unknown IoT devices;
determining, by the mobile device, that the mobile device is in an unsecure environment in response to the mobile device determining that the number of proximate unknown IoT devices that are not members of the registered subset of IoT devices at the first geographic location is greater than or equal to the threshold number of proximate unknown IoT devices; and
launching, by the mobile device, a self-protection mode of operation on the mobile device in response to the mobile device determining that the mobile device is in the unsecure environment.

2. The computer-implemented method of claim 1, wherein the self-protection mode of operation includes encrypting data on the mobile device.

3. The computer-implemented method of claim 1 further comprising:
establishing, by the mobile device, a second set of IoT devices within a second domain at a second geographic location by communicating with respective members of the second set of IoT devices.

4. The computer-implemented method of claim 3, wherein the mobile device communicates with the first set of IoT devices in the first domain at the first geographic location and the second set of IoT devices in the second domain at the second geographic location via short-range wireless direct peer-to-peer communication.

5. The computer-implemented method of claim 3, wherein the first domain corresponds to a home location and the second domain corresponds to a work location.

6. The computer-implemented method of claim 1, wherein the mobile device determines that it is in a secure environment in response to establishing proximity to at least one member of the registered subset of IoT devices in the first domain, and wherein the mobile device determines that it is in the unsecure environment in response to establishing proximity to only the number of proximate unknown IoT devices at the first geographic location.

7. The computer-implemented method of claim 1 further comprising:
probing, by the mobile device, spatially-adjacent IoT devices within a local environment on a predetermined time interval basis via short-range electronic interrogation.

8. The computer-implemented method of claim 7 further comprising:
assessing, by the mobile device, a level of risk corresponding to the local environment based on the short-range electronic interrogation of the spatially-adjacent IoT devices.

9. The computer-implemented method of claim 1 further comprising:
sending, by the mobile device, a notification to the user corresponding to the mobile device indicating that the self-protection mode is enabled on the mobile device and identifying a current geographic location of the mobile device.

10. The computer-implemented method of claim 9 further comprising:
disabling, by the mobile device, the self-protection mode on the mobile device in response to the mobile device receiving a valid response to the notification.

11. A mobile data processing system for protecting a mobile device,
the mobile data processing system comprising:
a bus system;
a storage device connected to the bus system, wherein the storage device stores program instructions; and
a processor connected to the bus system, wherein the processor executes the program instructions to:
establish a first set of Internet of Things (IoT) devices in a first domain at a first geographic location by communicating with respective members of the first set of IoT devices;
identify respective ones of the first set of IoT devices within the first domain as registered to a user corresponding to the mobile device based on a list of registered devices generating a registered subset of IoT devices that includes the mobile device;
determine a number of proximate known IoT devices that are members of the registered subset of IoT devices at the first geographic location and a number of proximate unknown IoT devices that are not members of the registered subset of IoT devices at the first geographic location;
determine whether the number of proximate unknown IoT devices that are not members of the registered subset of IoT devices at the first geographic location is greater than or equal to a threshold number of proximate unknown IoT devices;
determine that the mobile device is in an unsecure environment in response to determining that the number of proximate unknown IoT devices that are not members of the registered subset of IoT devices at the first geographic location is greater than or equal to the threshold number of proximate unknown IoT devices; and
launch a self-protection mode of operation on the mobile device in response to determining that the mobile device is in the unsecure environment.

12. The mobile data processing system of claim 11, wherein the self-protection mode of operation includes encrypting data on the mobile device.

13. The mobile data processing system of claim 11, wherein the processor further executes the program instructions to:
establish a second set of IoT devices within a second domain at a second geographic location by communicating with respective members of the second set of IoT devices.

14. The mobile data processing system of claim 13, wherein the mobile device communicates with the first set of IoT devices in the first domain at the first geographic location and the second set of IoT devices in the second domain at the second geographic location via short-range wireless direct peer-to-peer communication.

15. A computer program product for protecting a mobile device, the computer program product comprising a computer readable storage device having program instructions embodied therewith, the program instructions executable by the mobile device to cause the mobile device to perform a method comprising:
establishing, by the mobile device, a first set of Internet of Things (IoT) devices in a first domain at a first geographic location by communicating with respective members of the first set of IoT devices;
identifying, by the mobile device, respective ones of the first set of IoT devices within the first domain as registered to a user corresponding to the mobile device based on a list of registered devices generating a registered subset of IoT devices that includes the mobile device;
determining, by the mobile device, a number of proximate known IoT devices that are members of the registered subset of IoT devices at the first geographic location and a number of proximate unknown IoT devices that are not members of the registered subset of IoT devices at the first geographic location;
determining, by the mobile device, whether the number of proximate unknown IoT devices that are not members of the registered subset of IoT devices at the first geographic location is greater than or equal to a threshold number of proximate unknown IoT devices;
determining, by the mobile device, that the mobile device is in an unsecure environment in response to the mobile device determining that the number of proximate unknown IoT devices that are not members of the registered subset of IoT devices at the first geographic location is greater than or equal to the threshold number of proximate unknown IoT devices; and
launching, by the mobile device, a self-protection mode of operation on the mobile device in response to the mobile device determining that the mobile device is in the unsecure environment.

16. The computer program product of claim 15, wherein the self-protection mode of operation includes encrypting data on the mobile device.

17. The computer program product of claim 15 further comprising:
establishing, by the mobile device, a second set of IoT devices within a second domain at a second geographic location by communicating with respective members of the second set of IoT devices.

18. The computer program product of claim 17, wherein the mobile device communicates with the first set of IoT devices in the first domain at the first geographic location and the second set of IoT devices in the second domain at the second geographic location via short-range wireless direct peer-to-peer communication.

19. The computer program product of claim 17, wherein the first domain corresponds to a home location and the second domain corresponds to a work location.

20. The computer program product of claim 15, wherein the mobile device determines that it is in a secure environment in response to establishing proximity to at least one member of the registered subset of IoT devices in the first domain, and wherein the mobile device determines that it is in the unsecure environment in response to establishing proximity to only the number of proximate unknown IoT devices at the first geographic location.

* * * * *